(12) United States Patent
Laakso et al.

(10) Patent No.: US 7,551,544 B2
(45) Date of Patent: Jun. 23, 2009

(54) POWER CONTROL OF DIGITAL SUBSCRIBER LINE

(76) Inventors: Timo Laakso, Munkkiniemenranta 43, Fin-00330, Helsinki (FI); Antti Tommiska, Vuorikummuntie 14 A, Fin-00390, Helsinki (FI)

(*) Notice: Subject to any disclaimer, the term of this patent is extended or adjusted under 35 U.S.C. 154(b) by 626 days.

(21) Appl. No.: 10/520,376

(22) PCT Filed: Jul. 3, 2002

(86) PCT No.: PCT/FI02/00601
§ 371 (c)(1),
(2), (4) Date: Oct. 21, 2005

(87) PCT Pub. No.: WO2004/006492
PCT Pub. Date: Jan. 15, 2004

(65) Prior Publication Data
US 2006/0153106 A1 Jul. 13, 2006

(51) Int. Cl.
*H04J 1/12* (2006.01)
(52) U.S. Cl. .................................. 370/201
(58) Field of Classification Search .......... 370/201, 370/282; 375/296; 324/628
See application file for complete search history.

(56) References Cited

U.S. PATENT DOCUMENTS

| | | | | |
|---|---|---|---|---|
| 3,745,266 A * | 7/1973 | Niedereder | ............ | 324/628 |
| 6,229,855 B1 * | 5/2001 | Takatori et al. | ........... | 375/296 |
| 6,647,058 B1 * | 11/2003 | Bremer et al. | ............ | 375/222 |
| 6,697,487 B1 * | 2/2004 | Getchell | ............ | 379/417 |
| 6,839,429 B1 * | 1/2005 | Gaikwad et al. | ........... | 379/417 |
| 6,871,020 B1 * | 3/2005 | Boroditsky et al. | .......... | 398/38 |
| 6,959,126 B1 * | 10/2005 | Lofland et al. | ............ | 385/16 |
| 7,158,563 B2 * | 1/2007 | Ginis et al. | ............ | 375/224 |
| 2001/0012321 A1* | 8/2001 | Terry | ............ | 375/227 |
| 2002/0041657 A1* | 4/2002 | Ulanskas et al. | ......... | 379/27.01 |

* cited by examiner

Primary Examiner—Min Jung
(74) Attorney, Agent, or Firm—Fasth Law Offices; Rolf Fasth

(57) ABSTRACT

This invention relates to power control arrangements of digital subscriber lines. The invention controls parallel subscriber lines simultaneously in an organized way, based on the measurements of crosstalk conditions of the sub-scriber lines. Different crosstalk conditions are measured. The organized way to control the transmission power levels ensures that the crosstalk does not increase to an unacceptable level in each of the subscriber lines.

30 Claims, 2 Drawing Sheets

POWER CONTROL OF DIGITAL SUBSCRIBER LINE

FIELD OF THE INVENTION

This invention relates to power control arrangements of digital subscriber lines. Especially, the invention relates to power control in a VDSL system.

BACKGROUND OF THE INVENTION

Digital Subscriber Line (DSL) is a common term for various techniques, which make it possible to transmit digital traffic over ordinary telephone lines. Thus, a normally used abbreviation is xDSL wherein x can be replaced by a letter that identifies the technique in question. So the acronym xDSL refers collectively to a number of variations of the DSL technology, which aim at utilizing the information transmission capability of ordinary copper wires to the greatest possible extent. Known variations that go under the umbrella definition of xDSL are at the priority date of this patent application ADSL (Asymmetric Digital Subscriber Line), CDSL (Consumer DSL, registered trademark of Rockwell International Corp.), G. Lite (also known as DSL Lite, splitterless ADSL, and Universal ADSL; officially ITU-T standard G-992.2), HDSL (High bit-rate DSL), RADSL (Rate-Adaptive DSL), SDSL (Symmetric DSL), SHDSL (Symmetric High bit-rate DSL.), VDSL (Very high data rate DSL) and even to some extent UDSL (Unidirectional DSL), which is only a proposal, and IDSL (ISDN DSL), which is actually closer to ISDN (Integrated Services Digital Network).

As mentioned, the DSL technology provides transport of digital information over telephone subscriber lines. High speed digital transmission via telephone lines requires advanced signal processing to overcome transmission impairments due to crosstalk from the signals present on other wires in the same cable, and signal reflections. FIG. 1 illustrates an example of the crosstalk caused by the other lines. The central office (CO) 1 transmits line specific signals to a number of customer premises equipment 2. Each line uses an individual transmission power. As illustrated in FIG. 1, the first signal to the first CPE 2A is exposed to the crosstalk from the other lines, which can be detected at the receiving end. The crosstalk of the single line to the first line is illustrated as a dashed line. This type of crosstalk is called far-end crosstalk (FEXT), wherein crosstalk noise from a transmitted signal is detected at the receiving end of a parallel line. Naturally, all receiving ends are similarly exposed to crosstalk from parallel lines.

Since each line affects parallel lines and transmission times vary from line to line, a great number of situations exist where crosstalk conditions are different. When the transmission power of a line is high, it produces a good signal-to-noise ratio (SNR), but at the same time it also increases crosstalk in parallel lines.

At present, the transmission power in digital subscriber lines is constant with an option for power reduction (backoff) in certain situations. The optional power backoff is based on only the measured signal attenuation in the line.

According to the known solutions, nominal transmission power generates unnecessary heat. The heat exhausts and even damages the components and devices of a subscriber line. Further, the known solutions induce unnecessarily high crosstalk situations, which may even lead to link failures. Furthermore, the known solutions do not utilize the transmission capacity of subscriber lines effectively.

The goal of the invention is to alleviate the above-mentioned drawbacks of the known solutions. The goal is achieved in a way described in the claims.

SUMMARY OF THE INVENTION

The idea of the invention is to control parallel subscriber lines simultaneously in an organized way based on the measurements of crosstalk conditions of the subscriber lines. All different crosstalk conditions (caused by the use of several transmission power levels and different transmission on/off situations of the subscriber lines) are measured. Since the crosstalk affects all subscriber lines, a change of a transmission power level in a single line may increase the detected crosstalk in another line. But it may also decrease the detected crosstalk in yet another line, so the control of transmission power levels is a multivariable control for transmission power levels of several lines. The organized way to control the transmission power levels ensures that the crosstalk does not increase to an unacceptable level in each of the subscriber lines. Using the crosstalk measurements for controlling the transmission power levels, it is possible to achieve better performance of the subscriber lines. Also power consumption may decrease.

So, the inventive method controls transmission power levels of several subscriber lines simultaneously. The method comprises essential steps of measuring crosstalk properties for each subscriber line in different situations, estimating crosstalk values from the measured crosstalk properties, organizing the crosstalk values of the different situations, and controlling the transmission power levels using the organized crosstalk values.

Furthermore, the method comprises an initial measuring step for sending line specific test signals from a transmitting end to a receiving end in each line wherein the crosstalk properties are measured. This measurement needs to be carried out only once for each line taken into use.

An arrangement according to the invention controls transmission power levels of several subscriber lines simultaneously, essentially comprising means for measuring crosstalk properties for each subscriber line in different situations, means for estimating crosstalk values from the measured crosstalk properties, means for organizing the crosstalk values of the different situations, and means for controlling the transmission power levels using the organized crosstalk values.

Furthermore, the arrangement comprises means for sending line specific test signals from a transmitting end to a receiving end in each line, which comprise the measurement means.

BRIEF DESCRIPTION OF THE DRAWINGS

In the following the invention is described in more detail by means of FIGS. 1-4 in the attached drawings where.

DETAILED DESCRIPTION OF THE INVENTION

The crosstalk from a copper pair to another is based on capacitive and inductive coupling between the pairs and is usually strongest to the nearest pairs, i.e. to those in the same cable or to adjacent binders in the same cable. These crosstalk properties can be assumed to be remarkably constant, since the cabling topology and its physical properties are seldom affected after installation. Hence, the crosstalk properties between given pairs can be measured beforehand, the measured information can be stored and used to estimate an overall crosstalk value at each pair based on the line activity situation.

A preferable property of the crosstalk measurement is that it can be used during normal operations of DSL lines, so that no harm (or at most very little harm, or only a minor decrease in signal-to-noise ratio (SNR) of any DSL link) is caused.

The far-end crosstalk (FEXT) from a pair to another pair (from the transmitting end of the first pair to the receiving end of the second pair) is considered to be a significant crosstalk source in FDM (Frequency Division Multiplexed) systems, which should be taken into account when controlling the transmission power levels of the subscriber lines. The FEXT can be characterized by a FEXT transfer function (FTF), to be denoted here by $H_{12}(f)$. It is generally a function of frequency. Considering a given frequency band and realistic transmission power spectrum, the effect of the FEXT transfer function can be condensed into a single number, a FEXT coefficient (FC) denoted by $r_{12}$, which is generally a small positive number. FC is normally obtained by integrating the received power spectrum over the frequency band of interest.

Figure 1:
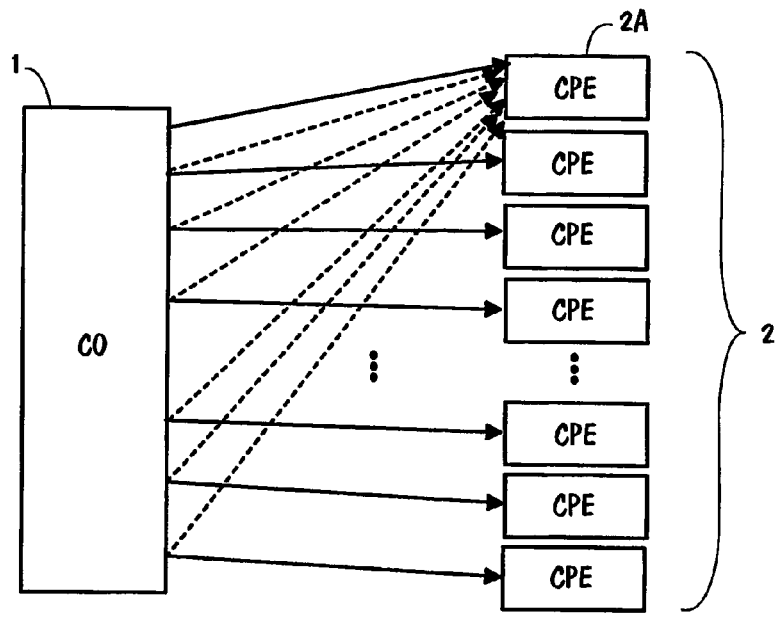
FIG. 1 illustrates an example of crosstalk from several lines to one line.
Figure 2:
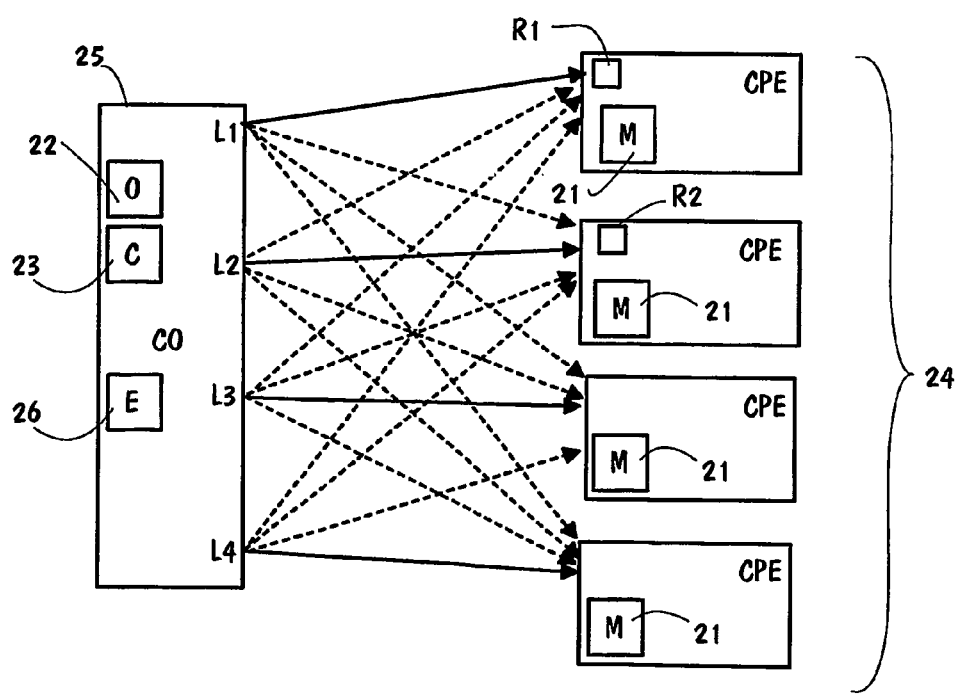
FIG. 2 illustrates an example of measuring the crosstalk properties in downstream transmission.

In the downstream direction, as illustrated in FIG. 2, the crosstalk (FEXT) into a particular pair induced from another neighboring pair can be measured by transmitting a test signal from the CO (such as DSLAM) and measuring the effect at the CPE receiver 24 (possibly by a special test receiver). The measurement can be done one by one for each pair by transmitting a test signal from each transmitter of the CO in the same cable and measuring the effect at each CPE using measuring means 21.

There are many ways to do the actual measurements. It can be done off-line by disabling all normal use for a short period (e.g. at night). It may also be done during normal transmission by using a low-power test signal (e.g. a pseudonoise test sequence) so that the normal operation is disturbed as little as possible.

When the crosstalk properties for a new line are measured, it is important to note that only the crosstalk effect from the old lines to the new line need to be measured. Due to the reciprocity, the crosstalk is symmetric between pairs and so the crosstalk coefficients between the new line and the old lines are obtained by the illustrated set of measurements. The measurement needs to be done only once for every line taken into use.

It is preferable to organize the measurements of the crosstalk of the lines in the CO, since all lines have been connected to it, and it comprises means to adjust the downstream transmission powers of the subscriber lines. So, the CPEs preferably transmit the crosstalk measurements to the CO, wherein estimating means 26 estimates crosstalk values from the measured crosstalk properties, and the crosstalk values are organized in an organizing means 22. A Control means 23 uses the organized crosstalk values for controlling the transmission power levels of the subscriber lines.

Figure 3:
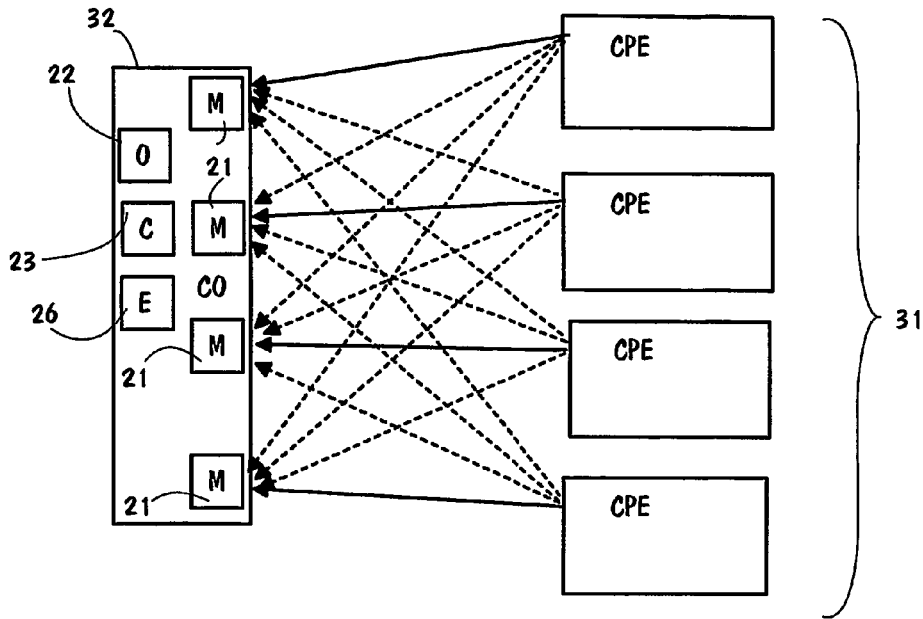
FIG. 3 illustrates an example of measuring the crosstalk properties in upstream transmission.

In the upstream direction, as illustrated in FIG. 3, the crosstalk information (FEXT) is measured in a reverse arrangement. Now also the measurements are done in the CO 32, which comprises the measurement means 21. The CPEs 31 sends the signals to be measured. Only the new CPE transmits the test signal and the crosstalk effect is measured at old lines ends in the CO. Similarly to downstream, upstream measurements can also be carried out off-line or during normal operation.

Both measurements produce entries into the organizing means 22, which preferably comprises a downstream crosstalk matrix and an upstream crosstalk matrix. So, the organization of the crosstalk values is done for making the control function easier (and even possible to make). Without any organization the handling of a number of variables is very tedious. Matrices are a good alternative to organize several values.

The control function takes into account the SNRs of the subscriber lines, in such a way that the SNRs do not go below limitations. So, the control function ensures that the SNR values are always good for transmitting payload signals. Furthermore, the control function tries to achieve and keep an as good as possible performance of the subscriber lines.

As can be seen, power control in the downstream direction (FIG. 2) is very straightforward to implement. The power control may even be assumed to be a part of a Network Management System (NMS), which can directly use the crosstalk information received from the CO. In contrast, in order to implement upstream crosstalk control (FIG. 3), measuring means need to be implemented at the CO, and the resulting power control commands must be transmitted to all the active CPE devices based on current upstream crosstalk conditions.

The power control strategy can have different targets for different links. Equal control policy will aim at control such that the link performance reduction effects due to crosstalk are distributed in an even and fair manner, whereas differentiated service control policy will allocate more crosstalk for lower service class links.

Actually the organization of the crosstalk measurements starts from the measurements themselves. The basic idea is to vary the transmitted power of a single link and measure the observed changes in crosstalk levels in the other links. Let us consider the system of FIG. 2. The CPE receiver RI is receiving the signal transmitted by the CO (such as DSLAM), and also a small contribution from a neighboring pairs signal via crosstalk. Lets assume that only line L2 causes crosstalk. This can be described by the equation $$R_1 = r_{11}P_1 + r_{12}P_2 + N_1 \quad (1)$$

where $R_1$ is the total received signal, $P_1$ is the power of transmitted signal to R1, and $P_2$ is the power of the transmitted signals to the second CPE receiver R2, $r_{11}$ is the attenuation of the first line and $r_{12}$ is the crosstalk coefficient between the lines L1 and L2. $N_1$ denotes noise and possible other crosstalk components at R1.

Now assume that a second measurement is made at an increased transmit power $P_2' = kP_2$. (k>1) in the neighboring line. This results in the total received signal power as $$R_1' = r_{11}P_1 + kr_{12}P_2 + N_1 \quad (2)$$

From (1) and (2) we can solve for the crosstalk power in the nominal case:

$$P_{crosstalk} = r_{12}P_2 = (R_1' - R_1)/(k-1) \quad (3)$$

or for the crosstalk coefficient $$r_{12} = (R_1' - R_1)/(P_2(k-1)) \quad (4)$$

Hence, by two crosstalk property (power) measurements an estimate for the crosstalk value (power or crosstalk coefficient) between two neighboring pairs can be obtained. When the power increase factor k (k>1) is chosen so that the crosstalk does not reduce the link signal-to-noise ratio (SNR)

below the margin specified in standards, no harm is caused for normal VDSL link operation. The same formulas apply to the crosstalk between the other subscriber line pairs.

Note also that the power must be changed smoothly from $P_2$ to $kP_2$ so that no adverse transient effects are caused by sudden changes.

Illustrating the matter in another way the signal-to-noise ratio (SNR) of one line at the receiver is $$SNR_1 = \frac{r_{11}P_1}{r_{21}P_2 + n_1} \quad (5)$$

Let us consider the case where the noise term can be neglected and all the transmit powers are equal ($P_{T1}=P_{T2}$) (the nominal case (no power backoff)), and the nominal signal-to-FEXT ratio or SFR's (SNR without noise) is $$SFR_{1,nom} = \frac{r_{11}P_{T1}}{r_{21}P_{T2}} = \frac{r_{11}}{r_{21}} \quad (6)$$

For a more general case of more lines 1 to N, the general formula becomes $$SFR_{k,nom} = \frac{r_{kk}}{\sum_{\substack{n=1 \\ n \neq k}}^{N} r_{kn}} \quad (7)$$

So, when the FEXT coefficients ($r_{kn}$) and channel attenuations ($r_{kk}$) are determined in advance, the nominal (worst-case) SFR situation can be estimated off-line. If the nominal SFR is large enough, the transmit power may be reduced based on this information.

Furthermore, if it is known which lines are active, the estimate can be improved by taking only those terms in the FEXT summation:

$$SFR_{k,active} = \frac{r_{kk}}{\sum_{\substack{n=activelinesonly \\ n \neq k}} r_{kn}} \quad (8)$$

Thus, combining the FEXT coefficient information with line activity information makes it possible to dynamically control the transmit power according to the loading situation and thus to alleviate high-loading situations and improve service. The attenuation and FEXT coefficient measurements only need to be done once for every line taken into use.

Let us consider an example of a DSLAM with 5 users, 1 at the distance of 1000 m and all the others at 500 m. The channel attenuations are 45 dB and 22 dB, respectively (for 0.5 mm cable, TP2), which yield the channel attenuation coefficients (linear scale) $r_{11}=4.0\times10^{-5}$ and $r_{22}=r_{33}=r_{44}=r_{55}=6.0\times10^{-3}$. For simplicity, the FEXT coefficients are all assumed to be equal at −80 dB level, or $r_{kn}=10^{-8}$.

For the first subscriber, we get the nominal (worst-case) SFR as $SFR_{1,nom}=(4.0\times10^{-5})/(4\times10^{-8})=1000:=30$ dB This SFR figure enables a 64-QAM constellation to be used (when $10^{-7}$ bit error rate is assumed) However, in case of one FEXT only, the SFR is $SFR_{1,1FEXT}=(4.0\times10^{-5})/(1\times10^{-8})=4000:=36$ dB which is 6 dB better than the nominal SFR and would thus enable two bits more in the constellation (i.e, 256-QAM). If subscriber 1 has ordered high-class service, this could be his/her nominal data rate. If all the other (lower service class) subscribers are using their lines, they would thus all have to use 6 dB lower transmit power and also 2 bits lower constellation in order to keep the FEXT level for the 1$^{st}$ subscriber at the same level.

The above measurement arrangement applies for one measurement at a time. Multiple measurements can, of course, be made in a sequential manner. If one measurement gives very small crosstalk values, i.e. below a specified threshold, then one can either conclude that crosstalk is negligible or perform another measurement with a higher power increase factor and/or increased measurement time to get more accurate and reliable results.

To enable sequential measurement of multiple crosstalk coefficients, an orthogonal set of measurement times can be employed, as illustrated in Table 1, which illustrates measurement in receiver R1 in the arrangement of FIG. 2.

TABLE 1

Orthogonal set of measurement times, specifying the power increase factors $k_2$, $k_3$ and $k_4$ in neighboring lines L2, L3, and L4 when measuring the three lines' crosstalk properties simultaneously at the receiving end of L1.

|    | T1 | T2  | T3  | T4  | T5  | T6  | T7  | T8  |
|----|----|-----|-----|-----|-----|-----|-----|-----|
| L2 | 1  | 1   | 1   | 1   | $k_2$ | $k_2$ | $k_2$ | $k_2$ |
| L3 | 1  | 1   | $k_3$ | $k_3$ | 1   | 1   | $k_3$ | $k_3$ |
| L4 | 1  | $k_4$ | 1   | $k_4$ | 1   | $k_4$ | 1   | $k_4$ |

As can be seen from Table 1, during each time sequence (T1 to T8) a certain crosstalk condition is measured in R1. Similarly, the crosstalk condition can be measured in the receiving ends of the other lines. These kinds of measurements are preferably made in advance, before controlling the transmission powers of the lines. The test signal of each subscriber line is sent sequentially (T1 to T8) in such a way that signal levels of the test signal are sequent specific and a combination of the parallel sequences of the digital subscriber lines is time sequence specific.

Figure 4:
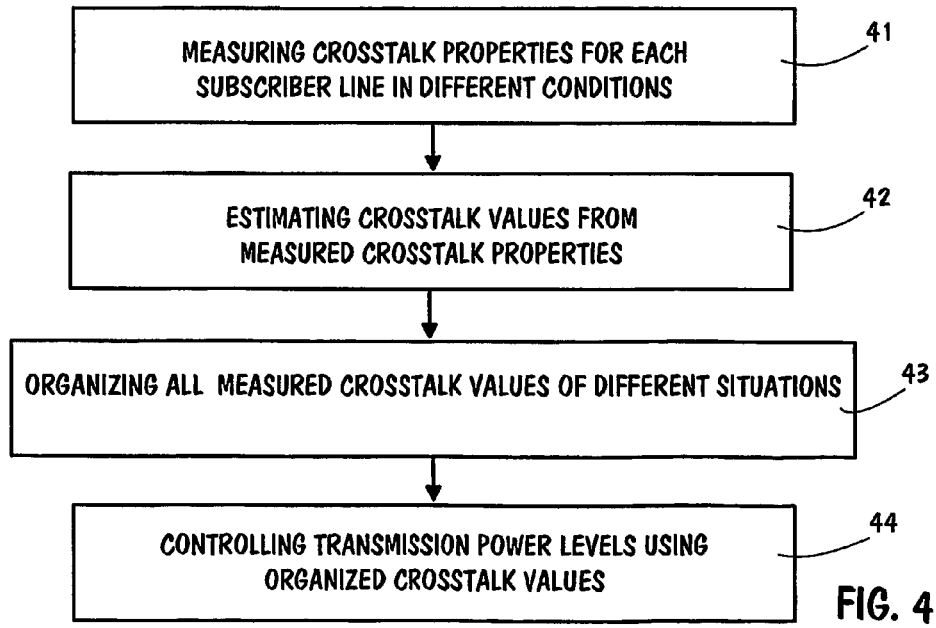
FIG. 4 illustrates a flow chart describing the inventive method.

FIG. 4 shows a flow chart according to the invention. At the beginning, the crosstalk properties are measured 41 for subscriber lines in different conditions. The conditions depend on transmission power levels at the time. After the measurements, the crosstalk values are estimated 42 from the measured crosstalk properties. The crosstalk values used are selected in such a way that they are easy to use later. Information from the test signals is used in the estimation. The crosstalk values are organized 43 so that they are useable for controlling 44 the transmission power levels to the subscriber lines.

As can be noticed, the invention controls the transmission power levels in a coordinated manner on all active DSL lines (both upstream and downstream) connected to one or more DSL Access Multiplexer (such as DSLAM's) so that the crosstalk situation is kept limited.

As mentioned, it is preferably to make the measurements in advance so that the necessary information of crosstalk parameters is available at the CO (DSLAM) end (or at a higher level in network hierarchy, e.g. in a Network Management System, NMS) to estimate the actual crosstalk power levels, when the line activity and transmit power is known.

There are at least two approaches for measuring the crosstalk properties, one for off-line measurements (all DSL lines connected to one DSLAM must be off normal use) and another for on-line measurements, which enable simultaneous use of VDSL connections with minimum interference.

Different power control strategies may be used, for example, either to use an equal control policy so that the link performance reduction effects due to crosstalk are distributed in an even and fair manner, or to use differentiated service control policy so that more crosstalk can be accepted for lower service class links.

For example by using service classes, higher service classes may be served in a high-loading situation as a nominal service (data rate and link quality), whereas lower service classes may be guaranteed only the performance in a low-loading situation. So, based on the observed loading situation, control the subscribers' transmit powers so that everyone's transmit power is kept at a minimum while guaranteeing the agreed performance. In a high loading situation, the low service class subscribers are commanded to reduce the transmit power (and data rate) if that is necessary to maintain the high service class performance.

Especially far-end crosstalk (FEXT) has been identified to be a major limitation to the transmission capacity of individual DSL links in a FDM system. Furthermore, this crosstalk is not constant, but depends on the number of simultaneous connections and it may have considerable variations even during a single DSL session.

This can be expected to be an issue in access networks with a high percentage of VDSL lines. Hence, in order to guarantee that all the VDSL links get the prescribed (or as good as possible) performance, the crosstalk disturbances should be kept to a minimum. This means that the transmission powers (and thus the induced crosstalk) should be controlled according to the loading situation.

The crosstalk measurements enable accurate transmission power control, resulting in less crosstalk, more reliable link performance, more transmission capacity, less power consumed.

The invention can be used in any DSL environment, but the preferable environment is a VDSL arrangement, especially VDSL modems.

There are several alternative ways for both crosstalk parameter estimation and power control, which are not mentioned in this text.

For example, instead of step-like power changes as described above, it is also possible to use smoothly changing power functions, like sinusoidally varying powers or triangular waveform etc. In such a case the power increase factor describes the increase in the average transmit power during the measurement period.

Due to the above-mentioned matters, it is evident that the invention is not restricted to the examples described in this text, but it can be used in many solutions, in the scope of the inventive idea.

The invention claimed is:

1. A method for controlling a transmission power level in a digital subscriber line, characterized in that transmission power levels of several digital subscriber lines are controlled simultaneously by the method comprising the steps of
    measuring crosstalk properties for each subscriber line in different situations;
    estimating crosstalk values from the measured crosstalk properties;
    organizing the crosstalk values of the different situations;
    controlling the transmission power levels using the organized crosstalk values;
    taking SNR limitations into account when controlling the transmission power levels; and
    making the control of the transmission power levels so that the crosstalk is distributed in such a way that more crosstalk is accepted for lower service class lines.

2. A method according to claim 1, characterized in that the method comprises a preliminary step before the measuring step for sending line specific test signals from a transmitting end to a receiving end in each line from which the crosstalk properties are measured.

3. A method according to claim 2, characterized in that the test signal of each subscriber line is sent sequentially in such a way that signal levels of the test signal are sequent specific and a combination of the parallel sequences of the digital subscriber lines is time sequence specific.

4. A method according to claim 2, characterized in that crosstalk properties are power levels of the test signals.

5. A method according to claim 2, characterized in that when estimating the crosstalk values, information from the test signals are used.

6. A method according to claim 1, characterized in that matrices are used when organizing the crosstalk values.

7. A method according to claim 1, characterized in that the control of the transmission power levels are made equally so that the crosstalk is distributed in an even and fair manner to the subscriber lines.

8. A method according to claim 1, characterized in that the measurements are made off-line.

9. A method according to claim 1, characterized in that the measurements are made on-line.

10. A method according to claim 1, characterized in that the digital subscriber lines are VDSL lines.

11. A method according to claim 1, characterized in that the measurements are made in advance, before controlling the transmission powers of the lines.

12. A method according to claim 1, characterized in that the crosstalk values are crosstalk power level values.

13. A method according to claim 1, characterized in that the crosstalk values are crosstalk coefficient values.

14. A method according to claim 1, characterized in that the measurements are made from a downstream signal.

15. A method according to claim 1, characterized in that the measurements are made from an upstream signal.

16. An arrangement for controlling a transmission power level in a digital subscriber line, characterized in that the arrangement controls transmission power levels of several digital subscriber lines simultaneously, comprising:
    means for measuring crosstalk values for each subscriber line in different situations;
    means for organizing the crosstalk values of the different situations;
    means for controlling the transmission power levels using the organized crosstalk values;
    means for taking SNR limitations into account when controlling the transmission power levels, and
    means for making the control of the transmission power levels equally so that the crosstalk is distributed in an even and fair manner to the subscriber lines.

17. An arrangement according to claim 16, characterized in that the arrangement comprises means for sending line specific test signals from a transmitting end to a receiving end in each line wherein the measuring means exits.

18. An arrangement according to claim 17, characterized in that the test signal of each subscriber line is sent sequentially in such a way that signal levels of the test signal are sequent specific and a combination of the parallel sequences of the digital subscriber lines is time sequence specific.

19. An arrangement according to claim 17 characterized in that when measuring the crosstalk values, information from the test signals are used.

20. An arrangement according to claim 16, characterized in that crosstalk properties are power levels of the test signals.

21. An arrangement according to claim 16, characterized in that matrices are used when organizing the crosstalk values.

22. An arrangement according to claim 16, characterized in that the control of the transmission power levels is made so that the crosstalk is distributed in such a way that more crosstalk can be accepted for lower service class lines.

23. An arrangement according to claim 16, characterized in that the measurements are made off-line.

24. An arrangement according to claim 16, characterized in that the measurements are made on-line.

25. An arrangement according to claim 16, characterized in that the digital subscriber lines are VDSL lines.

26. An arrangement according to claim 16, characterized in that the measurements are made in advance before controlling the transmission powers of the lines.

27. An arrangement according to claim 16, characterized in that the crosstalk values are crosstalk power level values.

28. An arrangement according to claim 16, characterized in that the crosstalk values are crosstalk coefficient values.

29. An arrangement according to claim 16, characterized in that the measurements are made from a downstream signal.

30. An arrangement according to claim 16, characterized in that the measurements are made from an upstream signal.

* * * * *